2,912,318

PROCESS FOR MAKING MIXED FERTILIZERS CONTAINING AMMONIUM NITRATE AND CALCIUM CARBONATE

Homer E. Kieweg, West Terre Haute, Ind., assignor to Commercial Solvents Corporation, Terre Haute, Ind., a corporation of Maryland No Drawing. Application January 16, 1957
Serial No. 634,426

2 Claims. (Cl. 71—47)

My invention relates to the production of mixed fertilizers and more particularly, it relates to the production of a stable mixed fertilizer containing ammonium nitrate and calcium carbonate.

Because of the condition of the soil in many parts of the country, it is necessary to add calcium carbonate in addition to nitrogen-supplying fertilizers in order to regulate the pH of the soil as well as provide a fertilizing material. In order to supply the additional materials, it has heretofore been necessary to make two applications, a time-consuming operation or to make a manual mixture of the fertilizer, such as ammonium nitrate, and other soil additives, such as calcium carbonate, which is a difficult task, involving large quantities of material and special mixing equipment.

In application Serial No. 533,919 by Leonard A. Stengel, there is described a process for preparing mixed fertilizers containing ammonium nitrate as the nitrogen-containing fertilizer material and one or more soil additives which can be a fertilizer such as, for example, ammonium sulfate; a liming agent, such as, for example, calcium carbonate; a soil conditioner, such as, for example, gypsum, etc. Such additional materials include ammonium sulfate, calcium carbonate, magnesium carbonate, gypsum, calcium sulfate hydrochloride, super or triple super phosphate, sodium nitrate, potassium nitrate, etc. or combinations of two or more of these materials. Such a process for preparing a mixed fertilizer is a vast improvement over that previously employed since the process consists essentially of adding the additional material to molten ammonium nitrate as it is continuously produced according to process described in U.S. Patent 2,568,901.

In producing mixed ammonium nitrate fertilizers according to the process described in U.S. Serial No. 533,919; however, it has been found that when the material present in addition to ammonium nitrate is calcium carbonate, there is a considerable loss of nitrogen following addition of the calcium carbonate to the molten ammonium nitrate. Such loss has been sufficient to reduce the quality and analysis of the fertilizer product and has created a serious problem in the production of mixed fertilizers containing ammonium nitrate and calcium carbonate according to this process.

I have now discovered a process for producing mixed fertilizers containing ammonium nitrate and calcium carbonate fertilizer which process results in a high analysis, good quality fertilizer product wherein nitrogen loss during production thereof is reduced to an infinitesimal amount.

In carrying out my invention, I mix the calcium carbonate with substantially anhydrous molten ammonium nitrate in any suitable mixing apparatus at a temperature at which the resultant mixture will remain fluid and then to the mixture I also add one of the compounds ammonium monohydrogen phosphate and potassium monohydrogen phosphate, which compounds are effective in preventing nitrogen loss from the ammonium nitrate upon addition of the calcium carbonate. Following mixture of the above-described ingredient, I then flow the mixture onto a moving, flat, endless belt to solidify the same after which it can be granulated to any desired particle size. I prefer to continuously produce substantially anhydrous molten ammonium nitrate by the method of U.S. Patent 2,568,901, collect the same in an agitated mixing pot to which the desired proportion of calcium carbonate and one of the compounds ammonium monohydrogen phosphate and potassium monohydrogen phosphate are then added, mixed, and the mixture then flowed to the flat, moving, endless belt.

As indicated, the mixture of molten ammonium nitrate and calcium carbonate must be prepared and maintained at a temperature at which the particular mixture employed remains in the fluid state. Obviously, the temperature must be above the melting point of ammonium nitrate which for the pure compound is about 337° F. Upon addition of the calcium carbonate, the temperature at which the mixture remains fluid is somewhat above the melting point for pure ammonium nitrate. For example, when 40% by weight limestone is employed as the calcium carbonate portion of the mixture, the mixture is satisfactorily fluid at a temperature as low as about 350° F. but temperatures below about 350° F. are undesirable by reason of the fact that the mixture is a thick and slowly running fluid which I have found inconvenient to process as far as flowing of the mixture onto the flat, moving, endless belt is concerned. For mixtures of ammonium nitrate and calcium carbonate of different proportions, the temperatures at which the mixtures have the desired fluidity would obviously vary.

In connection with the temperature of the molten mixture of ammonium nitrate and calcium carbonate, it is obvious that cooling of the molten ammonium nitrate takes place upon addition of the calcium carbonate thereto. Consequently, in order to avoid the necessity of using excessively high temperatures for the molten ammonium nitrate prior to addition of the calcium carbonate in order to prevent subsequent undersirable thickening of the fluid mixture, I prefer to pre-heat the calcium carbonate so that the amount of cooling of the molten ammonium nitrate upon mixture of the calcium carbonate therein is lessened. The temperature of the molten ammonium nitrate prior to mixing with the calcium carbonate can then be correspondingly lowered.

The amount of ammonium monohydrogen phosphate and potassium monohydrogen phosphate which I add to the mixture of ammonium nitrate and calcium carbonate varies with the amount of calcium carbonate added to the molten ammonium nitrate. For example, when the amount of calcium carbonate in the mix amounts to about 40%, I prefer to add the ammonium monohydrogen phosphate or potassium monohydrogen phosphate in amounts ranging from about 1 to 3%. Generally, it can be said that for most combinations of ammonium nitrate and calcium carbonate, at least about 1% ammonium monohydrogen phosphate or potassium monohydrogen phosphate is employed. It would, of course, be possible to add considerably more ammonium or potassium monohydrogen phosphate, but amounts above about 3% are unnecessary as far as elimination of nitrogen loss is concerned and consequently such amounts above about 3% merely serve to increase the cost of the product although ammonium and potassium monohydrogen phosphates are of value as fertilizers themselves.

In carrying out my new process, I can add the ammonium or potassium monohydrogen phosphate per se to the molten ammonium nitrate with the calcium carbonate or prior to the addition of the calcium carbonate or the ammonium monohydrogen phosphate can be formed in situ in the molten ammonium nitrate by addition of phosphoric acid to the nitric acid feed in the molten ammonium nitrate production process. The phosphoric acid can be added per se to the nitric acid or phosphate rock can be added to the nitric acid so that a nitric acid acidulation of the phosphate rock takes place thereby liberating phosphoric acid in the nitric acid after which the mixture of acids is contacted with ammonia to form the ammonium nitrate with the desired amount of ammonium monohydrogen phosphate therein.

Insofar as the calcium carbonate is concerned, I can employ any of the commercial forms of calcium carbonate such as chalk, high calcium limestone, etc. as well as the so-called precipitated calcium carbonate which is a relatively pure but considerably more expensive form of calcium carbonate. The dolomitic limestones containing substantial amounts of magnesium carbonate do not appear to cause the high nitrogen loss experienced upon addition of calcium carbonate in the pure or commercial form to molten ammonium nitrate. Consequently, I intend to include within the term calcium carbonate the pure or relatively pure forms and, in addition, the commercial forms such as chalk and high calcium limestone which latter material by definition contains at least about 95% calcium carbonate.

Following mixing of the molten ammonium nitrate, calcium carbonate and ammonium monohydrogen phosphate or potassium monohydrogen phosphate, I then flow the mixture onto a flat, moving endless belt for solidification. The flat, moving belt can be of any suitable, corrosion-resistant material such as, for example, Teflon, a suitable metal, etc. I prefer to employ a stainless steel belt. Merely flowing my molten mixture of ammonium nitrate and calcium carbonate onto the flat, moving belt at ordinary room temperatures is sufficient to cause solidification of the mixture. However, I prefer to effect cooling of the sheet to a temperature below about 200° F. in order to facilitate subsequent handling and bagging operations. The solid sheet of my new mixture can be cooled by any suitable means, such as, for example, by employing a cooling medium such as air flowing over the sheet on the flat, moving belt or employing cooling water in contact with the underside of the moving belt or merely allowing the mixture to solidify and cool under atmospheric conditions which latter means would require a considerably longer flat, moving belt than would be required when a cooling medium is employed.

The thickness of the sheet of solid ammonium nitrate mixture on the flat, moving belt can be controlled by varying the rate of flow of the molten mixture onto the belt and by varying the speed at which the belt is moved. Control of the width of the sheet produced can be facilitated by the use of an edge on the flat, moving belt which also provides for a sheet of uniform thickness from edge to edge. It is, of course, advantageous to produce a sheet with a thickness equivalent to the desired particle size after granulation of the sheet which feature reduces the granulation necessary to produce a product of the desired particle size.

Following production of the flat sheet of the ammonium nitrate mixture, I then granulate the mixture to any desired particle size. The granulation can be effected by use of any of the conventional devices for reducing the size of solid material such as, for example, a hammer mill, a roller mill, a granulator with rotating blades having a knife edge providing a shearing action, a granulator having paddle wheel blades to provide a crushing action, etc. A preferred granulator is one having a screened outlet so that the product is reduced to a size below any desired maximum, particles which will not pass through the screen being further granulated to produce particles of a size which will pass through the screen. The product is then preferably further screened to remove fines which can be returned to the mixing vessel for mixture with the molten ammonium nitrate, calcium carbonate, and ammonium or potassium monohydrogen phosphate.

The following examples are offered to illustrate my invention; however, I do not intend to be limited to the specific materials, proportions, or procedures described. Rather I intend to include within the scope of my invention all equivalents obvious to those skilled in the art.

EXAMPLE I

A series of runs was conducted in order to demonstrate the amount of nitrogen loss when calcium carbonate alone was added to molten ammonium nitrate and the amount lost when ammonium or potassium monohydrogen phosphate was added to the mixture. In these runs, the indicated amounts of ammonium and potassium monohydrogen phosphate were added to 120 grams of molten ammonium nitrate in a 500 ml. distillation pot fitted with a thermometer, an inlet tube for continuously purging the system and an exit tube leading to a bubbler containing 75 ml. of 4 N sulfuric acid to absorb ammonia. To this mixture was added 80 grams of Kent chalk, a naturally occurring form of calcium carbonate found in the British Isles, and the mixture agitated to thoroughly mix the ingredients. The evolving gas was absorbed for 5 minutes. Ammonium carbonate and/or bicarbonate collected in the exit tube and at the end of the run was quantitatively washed into the bubbler system. Following each run, the contents of the bubbler were diluted to 250 ml. and a 5 ml. aliquot taken for analysis. The results are shown in the following table.

*Table I*

| Additive | Amount, Gms. | Initial Temp., °F. | Nitrogen Loss, Percent |
|---|---|---|---|
| None | | 390 | 2.81 |
| $(NH_4)_2HPO_4$ | 2.5 | 390 | 0.32 |
| $(NH_4)_2HPO_4$ | 5.0 | 390 | 0.13 |
| $K_2HPO_4$ | 5.0 | 390 | 0.26 |

EXAMPLE II

Molten ammonium nitrate containing 0.14% moisture was produced at the rate of 123 lbs./hour according to the process described in U.S. Patent 2,568,901. The molten ammonium nitrate was flowed to a mixing vessel to which ammonium monohydrogen phosphate was added at the rate of about 4 lbs./hour and to which also, high calcium limestone containing at least 95% calcium carbonate was added at the rate of 85 lbs./hour. The temperature of the mix in the mixing vessel was about 375° F. The molten ammonium nitrate mixture was flowed onto a flat, stainless steel endless belt moving at the rate of 8.18 ft./minute over an effective length of 17 ft., the belt being 20 inches wide. The mixture was flowed onto the moving belt at the rate of 212 lbs./hour. Water was circulated in contact with the underside of the flat, moving belt in a bed extending under the belt. The molten ammonium nitrate mix solidified on the belt into a sheet which was run off the end of the belt into a granulator from which the product was obtained as small, solid, discrete particles. The product contained 21% nitrogen.

EXAMPLE III

Molten ammonium nitrate at the rate of 125 lbs./hour produced in accordance with the process described in U.S. Patent 2,568,901 and also containing ammonium monohydrogen phosphate in the amount of 2.1% (2.6 lbs./hour) produced in situ by adding phosphoric acid to the nitric acid feed in the ammonium nitrate process was flowed to a mixing vessel where it was mixed with 80 lbs./hour of Kent chalk, the temperature of the mixture in the mixing vessel being about 370° F. The mixture was flowed to a flat, moving stainless steel endless belt as described in Example II. The mixture contained 21.4% nitrogen.

EXAMPLE IV

The process of Example II was repeated using potassium monohydrogen phosphate.

Now having described my invention, what I claim is:

1. In a process for the production of a granular mixed fertilizer by introducing solid calcium carbonate particles into molten substantially anhydrous ammonium nitrate under such conditions that the resulting mixture is a slurry of solid calcium carbonate particles in molten ammonium nitrate, the improvement which comprises reducing the decomposition of ammonium nitrate following mixing of said solid calcium carbonate particles in said molten ammonium nitrate by mixing the solid calcium carbonate with the molten ammonium nitrate in the presence of at least about 1% of a compound selected from the group consisting of ammonium monohydrogen phosphate and potassium monohydrogen phosphate.

2. In a process for producing a granular mixed fertilizer by introducing solid calcium carbonate particles into molten substantially anhydrous ammonium nitrate obtained by reaction of ammonia with nitric acid, under such conditions that the resulting mixture is a slurry of solid calcium carbonate particles in molten ammonium nitrate; solidifying the mixture as a thin sheet; and granulating the thin, solid sheet of substantially discrete particles of calcium carbonate in a matrix of ammonium nitrate to obtain a mixed ammonium nitrate-calcium carbonate fertilizer of any desired particle size, the improvement which comprises reducing the decomposition of ammonium nitrate following mixing of said solid particles of calcium carbonate and molten ammonium nitrate by mixing the solid calcium carbonate with the molten substantially anhydrous ammonium nitrate in the presence of at least about 1% of a compound selected from the group consisting of ammonium monohydrogen phosphate and potassium monohydrogen phosphate.

References Cited in the file of this patent

UNITED STATES PATENTS

| Number | Name | Date |
|---|---|---|
| 1,854,291 | Burdick | Apr. 19, 1932 |
| 1,924,041 | Johnson | Aug. 22, 1933 |
| 1,969,650 | Klempt et al. | Aug. 7, 1934 |
| 2,036,481 | Kniskern et al. | Apr. 7, 1936 |
| 2,548,909 | Ryden | Apr. 17, 1951 |
| 2,555,656 | Plusje et al. | June 5, 1951 |
| 2,773,753 | Stengel | Dec. 11, 1956 |